March 3, 1931.  F. MILLIKEN  1,795,281
VALVE FOR USE WITH HEATED FLUIDS
Filed Nov. 24, 1928   2 Sheets-Sheet 1
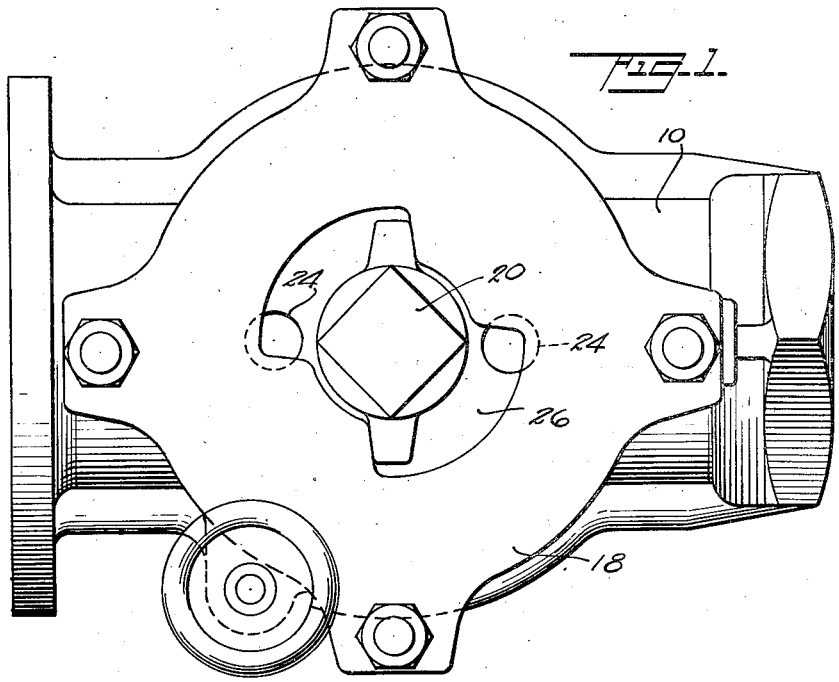
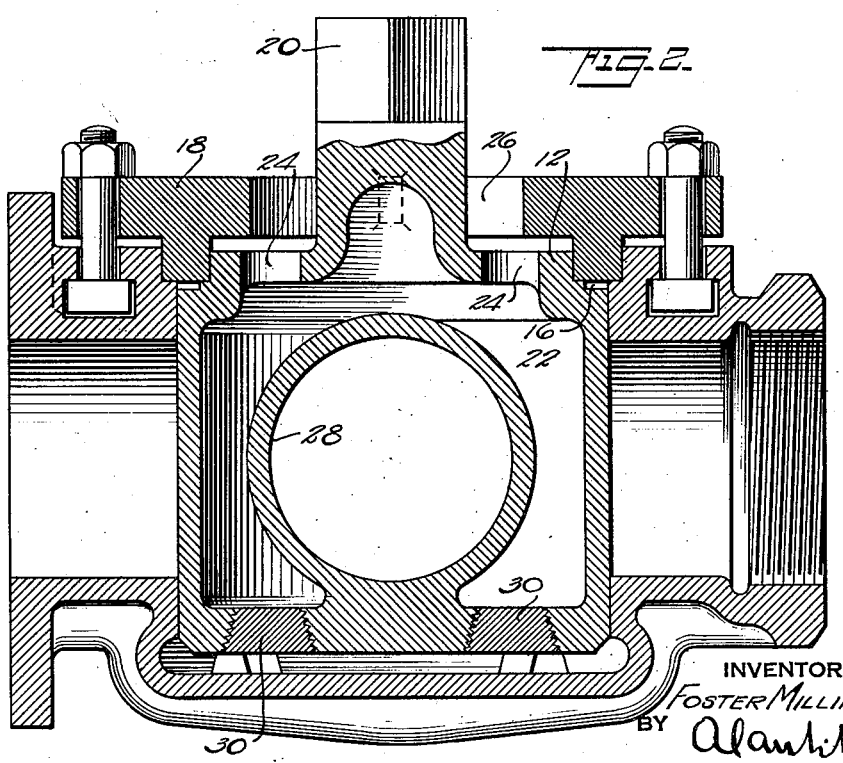
INVENTOR
FOSTER MILLIKEN
BY
ATTORNEY March 3, 1931. F. MILLIKEN 1,795,281
VALVE FOR USE WITH HEATED FLUIDS
Filed Nov. 24, 1928 2 Sheets-Sheet 2
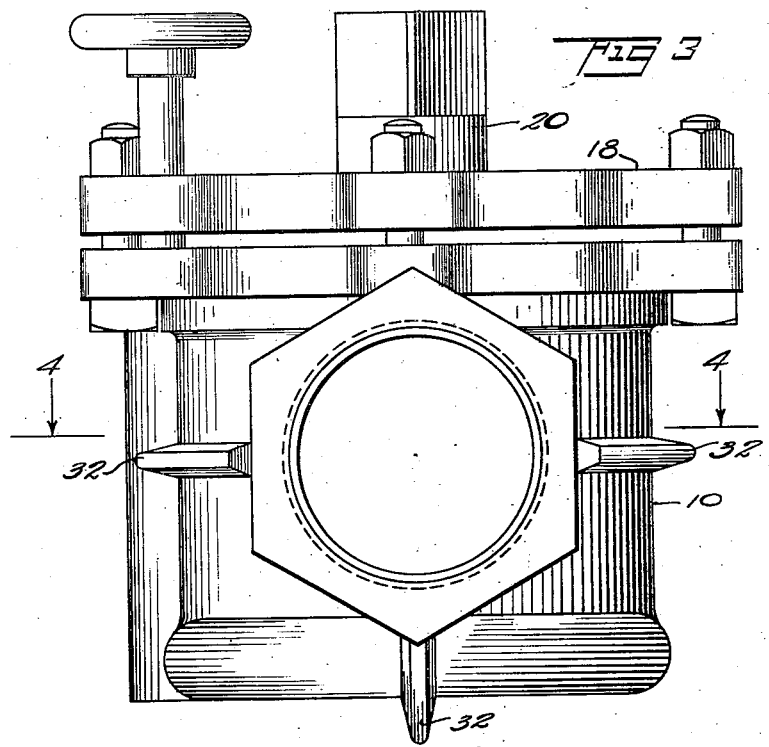
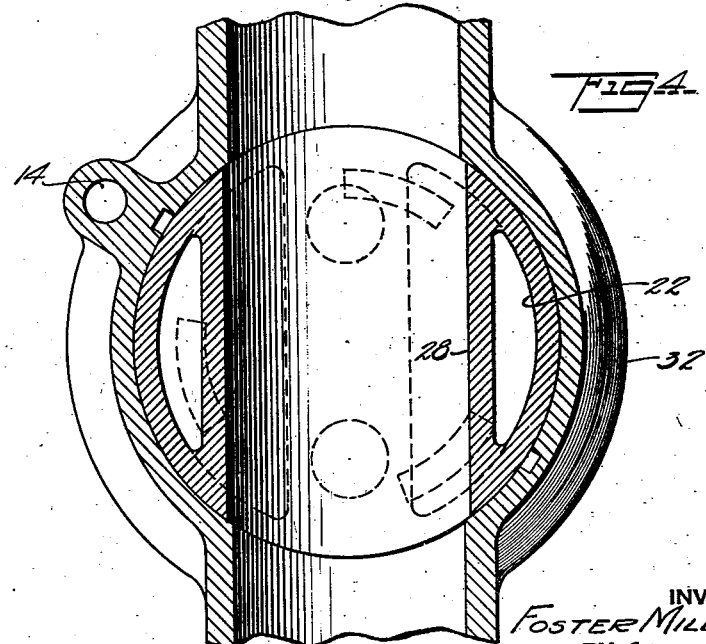
INVENTOR
FOSTER MILLIKEN
BY
ATTORNEY Patented Mar. 3, 1931

1,795,281

UNITED STATES PATENT OFFICE

FOSTER MILLIKEN, OF LAWRENCE, NEW YORK, ASSIGNOR TO MILLIKEN VALVE CORPORATION, A CORPORATION OF NEW YORK

VALVE FOR USE WITH HEATED FLUIDS

Application filed November 24, 1928. Serial No. 321,560.

Lubricated valves are ordinarily made with a plug adapted to rotate in a body with a passage formed through the plug adapted to register with inlet and outlet openings in the body. This type of valve has been criticized for use on lines containing fluids at high temperatures because of the tendency of the body of the valve to disseminate heat more rapidly than the plug, with the result that the plug may expand relative to the body and bind. This situation is particularly probable in the case where the plug is cylindrical, but may occur even in the case where the plug is tapered.

The present invention relates to a structure aimed to overcome this difficulty. To produce a valve having very little tendency to bind as a result of differential heat expansion, I form the plug substantially hollow, having thin walls, with vents near the top, and through this hollow space run an enclosed thin walled passage or pipe for the flow of the liquid. Such plug may be made in two pieces as by welding a piece of pipe inside and transverse the hollow plug, but I prefer to form the plug as an integral casting. The hollow space in the plug should be provided with one or more openings for the admission of a cooling medium. Ordinarily the normal circulation of air will be sufficient but if desired flexible connections may be made to such openings through which a cooling medium, such as water, may be forced. Such connections would also serve for the introduction of a heating medium such as steam if the use of such medium became advantageous as where a viscous material is in the line which might tend to congeal or harden inside the plug when the line is closed down and which could be brought into fluid condition by the use of such heat.

This invention can be readily understood by reference to the accompanying drawings, in which Fig. 1 is a plan view of a valve illustrating the same; Fig. 2 is a longitudinal section; Fig. 3 is an end view, and Fig. 4 is a section on line 4—4 of Fig. 3.

The valve here selected for the purpose of illustration is of the general type shown in my co-pending application, Ser. No. 262,089, filed March 16, 1928, having a main body portion 10 and a plug 12. As explained in said earlier application, this valve can be lubricated by lubricant inserted in chamber 14, and a seal against leakage is had by maintaining lubricant under pressure in the peripheral groove or chamber 16 which is covered by a gland 18 which is held down against bearing surfaces on the plug and body so that no packing is needed around the stem 20. Other details of construction of the lubricating system are fully described in said application.

The plug 12 is here shown as cast substantially hollow with a large central aperture 22 which is open at the top to the outside air through the holes 24. These holes 24 approximately register with the opening 26 formed in the gland 18. Integral with the plug 12 there is cast a transverse pipe 28 which connects at its ends with the walls of the plug and also may be connected to the bottom of the plug as shown in Fig. 2. The pipe 28 forms the passage through which the fluid will pass when the valve is open. To assist in the casting operation and the removal of the core, the plug may be formed with holes at the bottom which later may be tapped and filled as by tapered plugs 30.

In the arrangement as here shown, when hot fluid is passed through the pipe 28, this pipe will be free to expand inside the chamber 22. Due to the small area of connection between the pipe 28 and the main body of the plug 12, and the vented air space largely surrounding the pipe 28, relatively little heat will be transmitted to the exterior of the plug which will tend to remain at approximately the same temperature as the body 10 and therefore will expand equally with the body. If desired, the body 10 may be provided with fins as at 32, for disseminating heat.

It is understood that the example given is for the purposes of illustration only and may be modified in many particulars without departing from the spirit of my invention.

What I claim is:

1. In a valve of the type described, a body having an inlet and an outlet, a narrow walled plug adapted to rotate in the body having a passage adapted to register with such inlet and outlet, a single space in the plug about the walls of such passage extending on both sides thereof and an opening out of such space for the passage of a cooling medium.

2. A plug for use in valves of the type described, which has a single central cooling chamber opening to the top of the plug, and a thin walled pipe-like member extending through such chamber and united at its ends with the sides of the plug, not more than a small fractional portion of said member being attached directly to the end of the plug so that a maximum cooling area and expansion zone for the member will be afforded.

3. A thin walled plug for use in valves, consisting of an integral casting of generally cylindrical shape having a thin walled transverse passage of substantially uniform cross-section and a single cooling chamber in the plug largely surrounding the walls of such passage and extending on both sides thereof, said chamber having openings through the end of the plug for the flow of a cooling medium.

4. A substantially hollow, thin walled plug for use in valves subject to high temperatures, consisting of an integral casting of generally cylindrical shape, a transverse thin walled conduit of substantially uniform cross section contained therein, said plug having a large area devoted to a cooling and expansion chamber almost completely surrounding said transverse conduit, whose outside circumference, with the exception of one small portion thereof attached to the walls of the plug for positioning, is wholly open to the action of the chamber, said plug being vented through the top of the plug for the introduction of a cooling medium.

5. A substantially hollow, thin walled plug for use in valves subject to high temperatures, said plug comprising a vented hollowed shell, a relatively thin walled transverse conduit contained therein, said conduit being attached to the shell so as to afford an expansion and cooling chamber for said member.

FOSTER MILLIKEN.